April 26, 1966
M. H. MACKIN
3,248,302
PETRI DISHES
Filed April 23, 1963
2 Sheets-Sheet 1
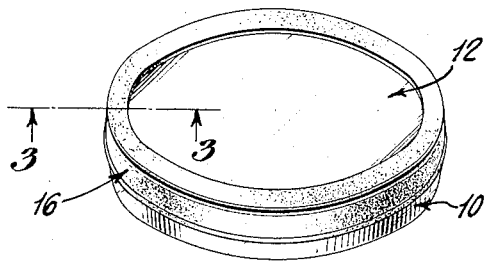
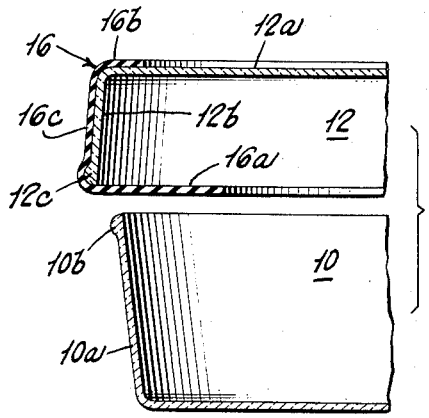
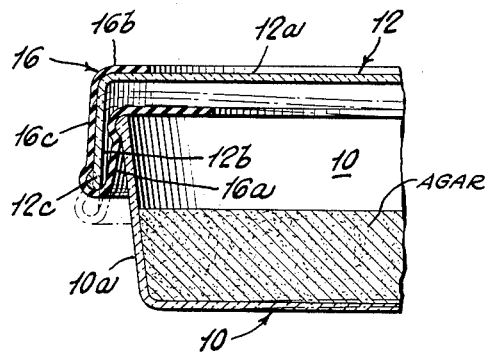
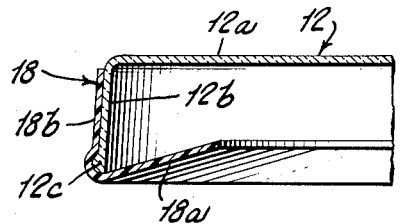
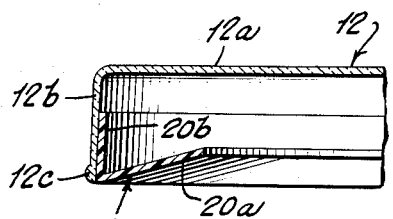
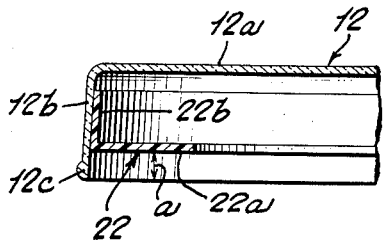
INVENTOR
MELBA H. MACKIN
BY *J. Harold Kilcoyne*
ATTORNEY INVENTOR
MELBA H. MACKIN
BY J. Harold Kilcoyne
ATTORNEY United States Patent Office 3,248,302
Patented Apr. 26, 1966

3,248,302
PETRI DISHES
Melba H. Mackin, Box 480, Perry, Fla.
Filed Apr. 23, 1963, Ser. No. 275,140
12 Claims. (Cl. 195—139)

This invention relates to improvements in petri dishes and more particularly to an improved petri dish or "plate" for use in growing strictly anaerobic bacteria, i.e., bacteria which will not grow in an atmosphere containing $O_2$ or which die on short exposure to $O_2$, by the so-called single plate method.

Existing single plate methods of growing anaerobic cultures have difinite limitations. For example, those using plates which are easily sealed, such as the Brewer plate and the Henderson plate, are limited to use of a culture medium containing a reducing agent (thioglycollate agar). Such a medium in itself possesses certain disadvantages accruing from the fact that with the Brewer plate, which incidentally has but a limited cultre area, the plate agar must be poured at the time of use, and in use of the Henderson plate, the thioglycollate medium becomes slightly toxic upon standing, consequent to its storage time being limited. While other single plate methods are available, they are too bulky or have a cumbersome seal or require the use of toxic reducing agents which give off carbon monoxide. Of course, adequate methods of growing strictly anaerobic cultures using sealed jars are known, but such do not in any manner provide the simplicity and flexibility of the single plate method, even with its aforesaid limitations.

From the above, it will be appreciated that the criteria for an ideal single plate method of growing bacteria under anaerobic conditions are generally as follows: that the method can be used routinely, that anaerobiosis (removal of oxygen) or other desired atmospheric conditions will result rapidly upon closing the culture dish or plate; that in the practice of the method any culture medium suitable to culturing the bacteria in a standard size petri dish (plate) can be used; and that no reducing agents toxic to bacteria need be used.

Stated broadly, it is a major aim of the present invention to provide an anaerobic petri dish or plate constructed and arranged so as to make possible the fulfillment of the aforesaid criteria for a single plate culture method in simple yet effective and dependable manner.

More particularly, the invention contemplates and provides a lid-to-dish (plate) seal for the conventional plastic petri dish, which not only seals the dish air-tight merely by placing the dish in the lid (which is the procedure followed by most bacteriologists in closing a petri dish or plate), but also accommodates for any change in air volume occurring within the dish as oxygen absoption proceeds, thus relieving stress upon the petri dish and/or its lid and making the dish more easily openable.

A further object of the invention is the provision of an effective lid or cover seal for petri dishes or plates used for single plate anaerobic cultures, characterized in that the seal proper comprises a thin elastic membrane under tension secured along its outer perimeter to the rim of the lid, or secured inside the lid a short distance from its rim, in such manner that it extends radially inwardly therefrom as a free-standing flange into the lid interior and thus in position to be contacted and thereupon stretched over and frictionally gripped to the edge of the dish as the dish is centered on the lid (or vice versa) and then pushed home thereon with but moderate finger pressure.

A still further object of the invention is the provision of a lid-to-dish or plate seal consisting of a thin elastic membranous sealing flange under tension as last aforesaid, wherein said flange may be utilized, in conjunction with the lid inner and/or under surfaces over which the flange extends, in providing an annular space (which may or may not be sealed) within the lid for storing the reducing agent or agents employed to effect oxygen absorption within the dish until ready for use, and further as a means for releasing said agent or agents to the dish interior responsive to pressure developing on said flange during the course of sealing the dish to the lid or the lid to the dish or plate. Alternatively, in the case of the reducing agent or agents being put up in one or more capsules, for example, the latter may be packaged within said annular space and supplied with the lid. Since the capsules of the type employed for such agents are usually of a frangible material, the pressure on a sealing flange of the invention developing during the operation of sealing the lid to the dish may similarly be utilized to release the capsulated reducing agent to the atmosphere inside the petri dish already containing the culture.

The above and other objects and features of advantage of an anaerobic petri dish seal according to the present invention will appear from the following detailed description, taken with the drawings referred to therein which depict variant forms thereof, wherein FIG. 1 is a perspective view of a petri dish having a lid sealed thereto as herein proposed;

FIG. 2 is an enlarged fragmentary sectional view of a petri dish, lid and one form of lid sealing means of the invention prior to sealing of the lid of the dish;

FIG. 3 is an enlarged partial sectional view taken on line 3—3 of FIG. 1, the broken lines indicating the occurrence of lowered air volume within the sealed dish;

FIGS. 4, 5 and 6 are fragmentary sectional views, on the same scale as FIG. 2, which illustrate modified forms of lid sealing means according to the invention;

Figure 7:
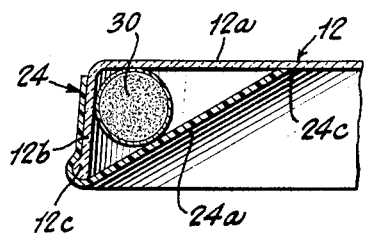
Figure 10:
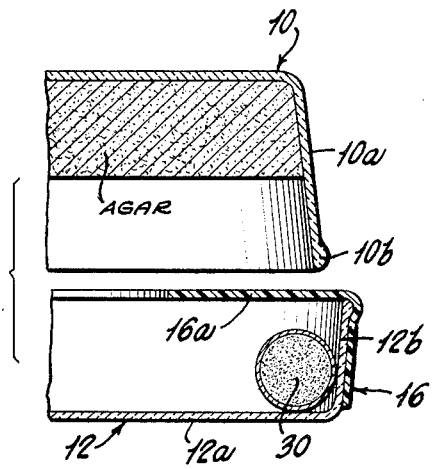
Figure 8:
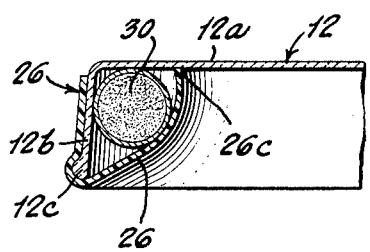
Figure 11:
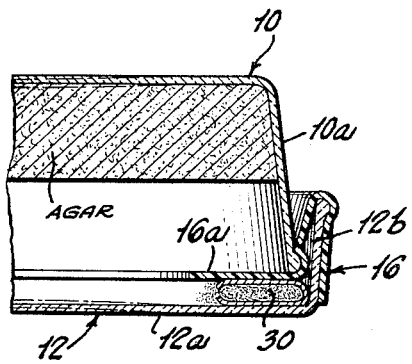

FIGS. 7 and 8 are fragmentary sectional views, again on the same scale as FIGS. 2 and 4–6, of a petri dish lid and somewhat further modified sealing means according to the invention, which illustrates the utilization of a sealing flange in providing with the inner and under surfaces of the lid an annular chamber adapted to contain the reducing agent or agents which when released to the enclosed atmosphere of the petri dish effect the absorption of oxygen therefrom;

FIG. 10 is a fragmentary sectional view generally similar to FIG. 2 but with dish or plate lid inverted as compared to the FIG. 2 positions, thus showing said parts ready for closing and sealing by placing the dish in the lid in accordance with the standard procedure followed by bacteriologists in closing a petri dish, the view further showing a capsule containing the reducing agent or agents stored in the lid; and FIG. 11 is a view generally similar to FIG. 10 but showing the dish fully closed and anaerobic, as results from the capsule being broken by the closing operation.

Referring to the drawings in detail and firstly to FIGS. 1–3, reference numeral 10 designates a conventional petri dish of the type heretofore commonly used in single plate methods of growing anaerobic cultures, such comprising a shallow dish or plate of transparent plastic material having a side wall 10a which flares outwardly by a small angle and terminates in a beaded upper edge or rim 10b. In said views, reference numeral 12 designates an overhanging lid or cover for the dish or plate, such being also fashioned from transparent plastic material and loosely fitting the dish proper, as is also conventional. More particularly, the lid is comprised by a circular top wall 12a and a depending, outwardly flaring side wall 12b which terminates in a lower beaded edge or rim 12c.

According to the invention, there is provided a lid-to-dish or plate seal for sealing the lid 12 in air-tight relation to the dish 10 responsive to said lid being merely centered with respect to and then closed, i.e., pushed home, on the dish. As will be hereinafter apparent, the seal of the invention is also capable of accommodating for any change in air volume occuring within the sealed dish as oxygen absorption proceeds, which accommodation is useful in relieving internal stress developing within the lidded dish as oxygen absorption proceeds, and also making the dish easily openable.

More particularly, the FIGS. 1–3 form of seal comprises an initially cylindrical band or annulus generally designated 16 of elastic tension material stretched about the lid 12. Illustratively, the annulus 16 is of sheet rubber of thickness of the order of toy balloon thickness and has an unstressed diameter substantially less and an axial length somewhat greater than the diameter of the lid and the depth of its side wall 12b, respectively. Thus, when this thin rubber annulus is stretched over the lid in the respective axial positions of annulus to lid in which said parts are shown in FIG. 2, and thereupon released to the lid, it will not only conform itself to the peripheral configuration of the lid and also secure itself in place on the lid by virtue of its tendency to return to its unstressed state, but also its lower edge portion 16a will extend radially inwardly into the lid space or enclosure from the lid rim 12c as a free-standing, i.e., spaced from the lid inner surface, thin elastic membranous flange under tension in its own plane and which is subject to being further stretched and/or deformed by the dish rim 10b as the dish is closed by the lid, for example, by placing the dish in the lid as will be described in connection with FIGS. 10 and 11.

While it is possible to dimension the thin rubber annulus with respect to the lid 12 so that when stretched over the lid and subsequently released thereto it will secure to the lid with the requisite degree of permanency, or at least against unintentional removal, it may prove desirable in some instances to positively secure said rubber annulus to the lid as by means of a rubber cement or adhesive applied to the under surfaces of both its top flange 16b and its central band portion 16c, and such an expedient is of course comprehended within the scope of the present invention.

The action of the free-standing elastic membranous flange 16a under tension as aforesaid in providing an air-tight seal between lid 12 and petri dish 10 will, it is believed, be clear from a consideration of FIGS. 2 and 3, of which FIG. 2 shows the lid centered on but still spaced above the dish, and FIG. 3 shows the lid as fully sealed to the dish. From FIG. 2 it will be seen that prior to final placement of lid on dish, said tensioned elastic, membranous flange 16c is positioned directly in the path of relative movement of dish rim 10c into the lid interior. When this relative movement takes place, the edge or rim 10b of the dish "sinks" into said flange 16a and in effect stretches same into the lid, thus further tensioning the flange both radially and axially, with the result that in tending to return to its unstressed state the tensioned flange frictionally clings to the outer surface of the dish wall 10a immediately adjacent the rim and to some extent to the rim thereof with a force which is adequate to secure and seal the lid in air-tight relationship to the dish. Preferably, the dish and/or lid are tilted slightly with respect to one another when partaking of their relative movement as aforesaid, so that the complete circumference of the dish rim does not contact the sealing flange at the same instant. Such prevents the build-up of pressure within the dish as the result of the lid being sealed thereto, and also it provides for a somewhat deeper sinking of dish rim into the flange than would occur when the dish and lid are in exact axial register as they move together. Consequent to the prevention of build-up of pressure within the dish during the course of the lidding operation, the outside atmospheric air pressure thereafter assists in maintaining the seal.

An important advantage of the seal achieved by a tensioned, thin elastic membranous and free-standing flange as aforesaid is that it remains air-tight as $O_2$ is removed from the air space within the dish 10, due to the ability of the flange to stretch or contract in accordance with pressure conditions developing within the dish. More particularly, the flange 16a prevents any strong negative pressure developing as anaerobiosis proceeds within the dish, as it permits the lid to lower on the dish (or the dish to lower into the lid as in FIG. 11) in accordance with lowering air volume in the dish. This is intended to be illustrated by the broken line position of the lid in FIG. 3.

Referring now to FIG. 4, such illustrates a modified form of lid-to-dish elastic seal according to the invention, characterized in that, instead of being fashioned from rubber as was the FIGS. 2 and 3 form, the membranous sealing flange 18a thereof is made of a thin elastic plastic sheet material, such as one of the so-called memory plastics, i.e., a plastic having both a memory of, and an ability to return to, its original shape. More particularly, such a seal comprises either a band or circle 18 of a suitable plastic material applied and secured to the lid 12 in such manner that its lower edge portion 18a extends as a generally radially inwardly directed membrane-like flange or lip under sufficient tension in its own plane as to be free-standing and which thus compares to the aforesaid flange 16a, into the interior of the lid from the lid edge 12c. Illustratively, the elastic plastic circle or annulus 18 is applied to the lid by arranging its upper edge portion 18b in encircling relation to the lid side wall 12b and then securing it to the outer surface of said side wall by a suitable cement or adhesive, or mechanically as by means of an encircling tie band or tie cord, or simply stretching it over the lid rim, as with the elastic rubber annulus of the FIGS. 3 and 4 form of sealing flange.

FIG. 5 illustrates yet another form of elastic plastic lid seal according to the invention. This seal, which is generally designated 20, corresponds in all substantial respects to the FIG. 4 form, and differs therefrom only in its mode of attachment to the lid 12. That is to say, the elastic sealing flange 20a thereof depends and extends inwardly from an attaching upper edge portion 20b, but rather than said edge portion being applied and secured to the outer surface of the lid side wall 12b, it is instead attached (as by cement or adhesive) to the inner surface of said side wall. Thus, the lid seal of the FIG. 5 form is completely enclosed within the lid 12.

FIG. 6 illustrates yet another highly desirable placement of the sealing flange 22a of a seal 22 enclosed within the lid, as with the FIG. 5 form. Here it will be appreciated that the distance a which the elastic membranous flange 22a is spaced above the lid rim 12c will keep any moisture from the dish away from the lid rim and hence will reduce the possibility of contamination after the lid is opened. Also, the little shelf which the flange 22a forms in relation to the dish or plate rim 10b will keep any moisture condensed on the flange away from both dish and lid rims which again reduce the likelihood of contamination.

In connection with the sealing flanges 18a and 20a of the FIGS. 4 and 5 forms of seal being shown to have a slight upward inclination, in contrast to the sealing flanges 16a (FIG. 2) and 22a (FIG. 6) which extend due horizontally into the lid space, it is explained that the angle of the flange, and this is true when the sealing circle or annulus is made either of rubber or plastic, depends on the initial size and shape of said band or annulus and to some extent also in the amount of pretensioning to which it is subjected when being applied to its associated lid. It will also be understood that the action of the elastic membranous flanges 18a, 20a and 22a of the plastic sealing band or annulus in stretching radially and axially when the rim of the dish or plate sinks into same during dish closing and, in tending to return to their unstressed shape, in then frictionally securing to the rim edge portion of the dish with the security necessary to provide an air-tight seal is the same as that previously described in connection with the rubber sealing flange 16a.

FIGS. 7 and 8 illustrate the possibility of utilizing the lid-to-dish sealing means of the invention in forming within the lid a sealed space for storing the reducing agent or agents employed to effect oxygen absorption until ready for use. Such sealing means, generally designated 24 in FIG. 7 and 26 in FIG. 8, is similar to that shown in FIG. 4, except that the sealing flange proper thereof has the radial length and the inclination necessary to its inner edge (24c and 26c respectively) making contact with the under surface of the lid 12 along a circular line. By sealing said inner edge of the flange to the under surface of the lid along its aforesaid line of contact therewith, as by means of a suitable adhesive, there is provided a sealed annular chamber within the lid for the storage, until ready for use, of the reducing agent or agents (or other chemicals or agents) for use in bringing about or effecting oxygen absorption (or other desired atmospheric condition) within the sealed petri dish.

Release of such agents to the atmosphere in the interior of the dish is readily effected as by use of an adhesive which releases when pressure is applied to the sealing flange 24a or 26a during the course of closing the dish (as by placing the dish on the lid) or of an adhesive which dissolves upon addition of a readily available solvent, or by manually puncturing said sealing flange adjacent its inner edge just prior to closing the dish.

The above assumes that the reducing agent or agents are contained and stored in loose form beneath the flange-enclosed lid space. However, it is also feasible to supply the aforesaid reducing agent or agents ready for use in capsules held in place within the lid by a sealing flange 24a, 26a, and this is illustrated in FIGS. 7 and 8, wherein the capsule containing said agent or agents is designated 30. In this case, both the adhesive holding the inner edge of the sealing flange to the under surface of the lid and the capsule 30 containing the reducing agent or agents are preferably broken to release the capsule contents to the dish-enclosed atmosphere by the pressure developing on both flange and capsule incident to closing the dish by placing the dish in the lid (or vice versa), depending on the dish closing technique employed.

Figure 9:
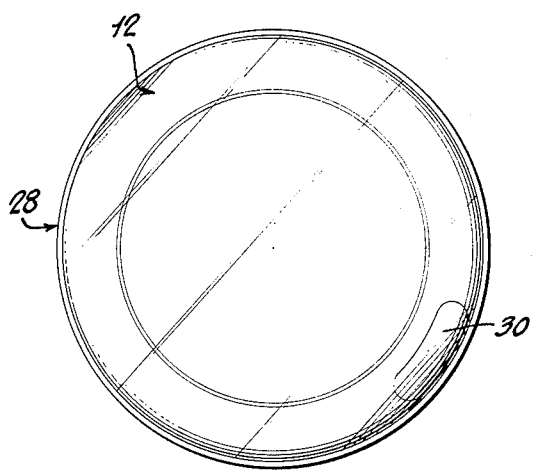

Since the capsule containing the reducing agent or agents is itself usually air-tight, it may ordinarily suffice, when supplying the capsulated agent ready for use with the lid, to store the capsule in the lid simply by securing said capsule in place beneath a sealing flange of the form thereof shown in FIG. 2 and FIGS. 4–6 inclusive, for example. Such is the arrangement generally shown in FIG. 10 which illustrates a pertri-dish 10 containing the agar or culture medium, a lid 12 provided with the dish-to-lid sealing means according to the FIG. 2 form, and a capsule 30 containing the reducing agent or agents necessary to the removal of oxygen from the atmosphere contained in the dish upon closing and sealing thereof, and wherein the capsule (also seen in FIG. 9) is normally secured beneath the flange merely by a spot of adhesive or even by a length of Scotch tape, for example. In explanation of both the dish and lid being shown inverted and the dish being disposed above the lid, it is explained that bacteriologists usually close a petri dish by first placing the lid in inverted position on a support, in which position it is adapted to receive the dish, and then, with the dish held inverted in the left hand, centering the dish on and pushing it down into the lid, thus leaving the right hand free for manipulating as may be necessary.

The action of the dish 10 being sealed to the lid 12 upon closing of the dish as aforesaid is illustrated in FIG. 11, which also shows the capsule 30 as having been broken open by the pressure developing thereon by the rim 10b of the dish as it sinks into the elastic sealing flange 16a, thus to release its contents to the dish-enclosed atmosphere while remaining under the sealing flange, which is most desirable because the reducing agent contents of the capsule are usually toxic to bacteria.

In the event that the reducing agent or agents being used are of the type which are put in solution by the addition of a few drops of water, for example, the solution remains under the sealing flange. This desirable retention of the solution beneath the flange is assisted by the lid becoming slightly concave downward as the result of the reduced pressure developing within the now sealed dish as removal of oxygen proceeds. Of course, the solution can be dislodged by bodily shaking the lid, but in normal handling the lid is never shaken, so that the sealing flange normally performs the function of reducing-solution retention, in addition to its primary dish-to-lid sealing function.

From the above, it will be appreciated that the herein described and illustrated dish or plate seal for use in carrying out the single plate method of growing bacteria under anaerobic conditions not only satisfies the objectives of the invention as explained above but also makes possible the fulfillment of the criteria of the ideal single plate method used for this important purpose. However, it is to be understood that since many changes could be made in carrying out the above constructions without departure from the scope of the invention, it is intended that all matter contained in the above description or shown in the accompanying drawing shall be interpreted as illustrative and not in a limiting sense.

I claim:

1. An anaerobic petri dish comprising a shallow dish adapted to contain a culture medium to be grown under anaerobic conditions, a loosely fitting overhanging lid therefor, and means providing an air-tight seal between said lid and said dish including a substantially free-standing membranous sealing flange fashioned of thin, pretensioned elastic material and being affixed along its outer edge to said lid so as to extend freely and generally radially inwardly from its overhanging side wall portion into the space within the lid and thus in the path of relative movement of the upper edge of the dish side wall into the lid which occurs when the dish is closed by said lid, said flange, by virtue of the elasticity of the material from which it is fashioned, being adapted, responsive to such movement, to be stretched radially and axially over said dish edge and thereupon to frictionally hold thereto and to the adjacent surface of said dish side wall with sufficient force as to secure the dish and lid in airtight relationship.

2. A petri dish, lid and sealing means as defined in claim 1, wherein the sealing flange is fashioned of thin sheet rubber.

3. A petri dish, lid and sealing means as defined in claim 1, wherein said sealing flange is fashioned of thin elastic plastic material.

4. A petri dish, lid and sealing means as defined in claim 1, wherein said sealing flange extends inwardly from the lower edge of the lid.

5. A petri dish, lid and sealing means as defined in claim 1, wherein said sealing flange extends inwardly from said lid at about the level of its lower edge and thence is continued in generally upward direction.

6. A petri dish, lid and sealing means as defined in claim 1, wherein said sealing means comprises a securing edge portion and a sealing-flange portion, each securing edge portion being secured to the side wall portion of said lid along its outer periphery.

7. A petri dish, lid and sealing means as defined in claim 1, wherein said sealing means is completely enclosed within the lid and comprises a securing edge portion secured to the inner periphery of the lid side wall and a sealing flange portion extending therefrom into the lid enclosure.

8. A petri dish, lid and sealing means as defined in claim 1, wherein said sealing flange inclines upwardly from about the level of the lower edge of the lid to the underside of the lid and is sealed along its inner edge to said under side, thereby to provide an annular sealed chamber within said lid.

9. A petri dish, lid and sealing means as set forth in claim 8, wherein a reducing agent is stored in said chamber and is released responsive to sealing of the dish lid to the dish being effected.

10. The combination of a receptacle having an upper peripheral edge, a lid adapted to loosely fit over said edge and including a peripheral, overhanging sidewall, and means for sealing the lid to the receptable responsive to relative axial closing movement of one against the other, said means comprising a sealing flange of thin elastic material under tension extending as a free-standing membrane from said lid side wall in radial inward direction into the interior of said lid and thus in the path of relative movement of the receptacle upper edge into the lid taking place when the receptacle and lid move against one another, the material of said flange being of a nature as to permit said upper edge to sink into the flange which results in said flange being further tensioned by and thereupon frictionally securing itself air-tight to said upper edge.

11. The combination according to claim 10, wherein said flange is fashioned from thin rubber sheet material.

12. The combination according to claim 10, wherein said flange is fashioned from thin elastic plastic sheet material.

References Cited by the Examiner
UNITED STATES PATENTS

| | | | |
|---|---|---|---|
| 2,148,468 | 2/1939 | Hothersall | 220—46 |
| 2,825,651 | 3/1958 | Loo et al. | 99—171 |
| 3,055,808 | 9/1962 | Henderson | 195—139 |
| 3,064,853 | 11/1962 | Lents et al. | 220—46 |

A. LOUIS MONACELL, *Primary Examiner.*

A. E. TANENHOLTZ, *Assistant Examiner.*